(12) United States Patent
Dong (10) Patent No.: US 11,243,422 B2
(45) Date of Patent: Feb. 8, 2022

(54) STEREOSCOPIC DISPLAY DEVICE, FABRICATION METHOD AND STEREOSCOPIC DISPLAY METHOD

(71) Applicant: BOE TECHNOLOGY GROUP CO., LTD., Beijing (CN)

(72) Inventor: Wenchu Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 520 days.

(21) Appl. No.: 16/097,701

(22) PCT Filed: Mar. 22, 2018

(86) PCT No.: PCT/CN2018/080036
§ 371 (c)(1),
(2) Date: Oct. 30, 2018

(87) PCT Pub. No.: WO2018/205754
PCT Pub. Date: Nov. 15, 2018

(65) Prior Publication Data
US 2021/0223569 A1    Jul. 22, 2021

(30) Foreign Application Priority Data
May 8, 2017  (CN) .......................... 201710316666.1

(51) Int. Cl.
*G02F 1/1333* (2006.01)
*G02B 30/54* (2020.01)
*G02F 1/1368* (2006.01)

(52) U.S. Cl.
CPC ....... *G02F 1/133305* (2013.01); *G02B 30/54* (2020.01); *G02F 1/1368* (2013.01); *G02F 1/13336* (2013.01); *G02F 1/133308* (2013.01)

(58) Field of Classification Search
CPC .... G02F 1/133305; G02B 27/36; G02B 30/54
See application file for complete search history.

(56) References Cited

U.S. PATENT DOCUMENTS 9,279,573 B1 * 3/2016 Perez-Bravo ............. G09F 7/20
2010/0033805 A1   2/2010 Lee et al.
(Continued)

FOREIGN PATENT DOCUMENTS

| CN | 101995692 A | 3/2011 |
| CN | 104932111 A | 9/2015 |

(Continued)

OTHER PUBLICATIONS

International Search Report and Written Opinion dated Jun. 22, 2018.
First Chinese Office Action dated Jan. 25, 2019.

*Primary Examiner* — Lucy P Chien
(74) *Attorney, Agent, or Firm* — Dilworth & Barrese, LLP.; Michael J. Musella, Esq.

(57) ABSTRACT

Embodiments of the present disclosure provide a stereoscopic display device, a fabrication method and a stereoscopic display method. The stereoscopic display device includes a control device, a display screen and a substrate, wherein the control device is provided between the display screen and the substrate, and the control device is configured to adjust a distance between the display screen and the substrate.

16 Claims, 3 Drawing Sheets

(56) References Cited

U.S. PATENT DOCUMENTS

| | | | |
|---|---|---|---|
| 2011/0037836 A1 | 2/2011 | Chang | |
| 2011/0043714 A1* | 2/2011 | Chang | G02B 30/54 |
| | | | 349/15 |
| 2013/0207946 A1* | 8/2013 | Kim | G09G 3/3225 |
| | | | 345/204 |
| 2017/0219837 A1 | 8/2017 | Gai et al. | |

FOREIGN PATENT DOCUMENTS

| | | | |
|---|---|---|---|
| CN | 104991681 A | 10/2015 | |
| CN | 105093544 A | 11/2015 | |
| CN | 105892971 A | 8/2016 | |
| CN | 205594505 U | 9/2016 | |
| CN | 107219634 A | 9/2017 | |

\* cited by examiner

STEREOSCOPIC DISPLAY DEVICE, FABRICATION METHOD AND STEREOSCOPIC DISPLAY METHOD

TECHNICAL FIELD

Embodiments of the present disclosure relate to a stereoscopic display device, a fabrication method and a stereoscopic display method.

BACKGROUND

With advancement and development of science and technology, people's enjoyment of material life and spiritual level has always increased continuously. With respect to the spiritual level, in the era when science and technology are changing rapidly, people hope to implement unfettered imagination with a display device, so as to achieve an immersive effect; and thus, how to make the display device present a stereoscopic image or video becomes an objective to be eagerly achieved by using a current display device technology.

A current stereoscopic display technology mainly includes, for example, a naked-eye 3D display technology and a spectacle 3D display technology, wherein the naked-eye 3D display technology may be divided into a lenticular lens method and a grating method according to an implementation method. A synthesized image is used in both methods, including image strips alternately arranged vertically or laterally, and these image strips are composed of a left image and a right image with a parallax. In the prior art, a stereoscopic display effect is achieved by using the parallax of both eyes. However, in the method, there may be problems such as image flicker, image stereoscopic brightness, image crosstalk, and the like.

SUMMARY

Embodiments of the present disclosure provide a stereoscopic display device, a fabrication method and a stereoscopic display method, which can control a distance between a substrate and a display screen by a microelectromechanical system, so that an image which is seen by a user has a better real stereoscopic display effect.

According to a first aspect, an embodiment of the present disclosure provides a stereoscopic display device, comprising: a control device, a display screen and a substrate, wherein the control device is provided between the display screen and the substrate, and the control device is configured to adjust a distance between the display screen and the substrate.

For example, the control device includes: at least one telescopic member, provided between the substrate and the display screen, and at least one telescopic member includes: an extending member, including one end close to the substrate and the other end away from the substrate; a fixed portion, with an end connected with the substrate, wherein a distance between the other end of an extension rod and an end of the fixed portion away from the substrate is changeable.

For example, the fixed portion is a hollow base that sleeves the extending member, a bottom portion of the hollow base is connected with the substrate, and the extending member is movable with respect to the hollow base, to change a distance between a portion of the display screen corresponding to the extending member and the substrate.

For example, the extending member extends from a top portion of the hollow base, so that a portion of the display screen corresponding to the extending member moves away from the substrate under an action of a pushing force of the extending member, when the extending member extends from the top portion of the hollow base, and a portion of the display screen corresponding to the extending member moves close to the substrate when the extending member retracts to the hollow base.

For example, the hollow base is an electromagnetic coil, and the extending member is a magnet body; when the electromagnetic coil is energized, a magnetic field is generated; and the magnet body extends from or retracts to the electromagnetic coil under an action of the magnetic field.

For example, the magnet body is a cylindrical structure whose outer surface is provided with a first thread, and an inner surface of the electromagnetic coil is provided with a second thread matching the first thread.

For example, a protective layer is provided on a surface of the extending member opposite to the display screen.

For example, the display screen is formed by a plurality of spliced display unit, and each of the display units corresponds to at least one telescopic member.

For example, the display units which are adjacent to each other are connected with each other through mutually engaged grooves or through mutually embedded concave-and-convex slide rails.

For example, a number of the fixed portions of the control device is smaller than a number of pixels of the display screen.

For example, a ratio of the number of the fixed portions of the control device to the number of the pixels of the display screen is 1:100 to 1:1000.

For example, the control device receives an electrical signal sent by the substrate, so that the control device adjusts the distance between the substrate and the display screen according to the electrical signal, and the electrical signal matches a stereoscopic display feature displayed by the display screen.

For example, the display screen is a flexible screen.

For example, the substrate is a TFT substrate.

For example, the substrate includes a plurality of seamlessly spliced TFT substrates.

According to a second aspect, an embodiment of the present disclosure provides a stereoscopic display method which is used in the stereoscopic display device according to the first aspect, the stereoscopic display method comprises: acquiring an image to be displayed on a display screen; extracting a stereoscopic display feature in the image; and obtaining a driving signal of a control device according to the stereoscopic display feature, so that the control device adjusts a distance between a substrate and the display screen according to the driving signal.

For example, the control device includes: at least one telescopic member, the converting the stereoscopic display signal into the driving signal of the control device, so that the control device adjusts the distance between the substrate and the display screen according to the driving signal, includes: converting the stereoscopic display signal into a driving signal in one-to-one correspondence with the at least one telescopic member.

According to a third aspect, an embodiment of the present disclosure provides a fabrication method of the stereoscopic display device according to the first aspect, the fabrication method comprises: fabricating a substrate and a control device by using a semiconductor fabrication process; providing a display screen; and cell-assembling the display screen with the substrate on which the control device is provided.

For example, the display screen is formed by a plurality of spliced display unit, the providing the display screen includes: providing a plurality of the display units; and splicing the plurality of display units into the display screen.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The embodiments of the present disclosure are described in detail below, and examples of the embodiments are illustrated in the drawings, wherein the same or similar reference numerals represent the same or similar elements or elements having the same or similar functions. The embodiments described below with reference to the accompanying drawings are exemplary, are only used to explain the embodiments of the present disclosure, and should not be construed as limit to the embodiments of the present disclosure.

In the description, the description with referring to the terms "an embodiment", "some embodiments", "example", "specific example" or "some examples" means that the specific feature, structure, material or character with connection with the embodiment or example is included in at least one embodiment or example. In the description, the schematic description of the above terms is not necessary to direct to the same embodiment or example. The described feature, structure, material or character may be combined in any suitable manner in any or a plurality of embodiments or examples. Further, in case of no conflict, different embodiments or examples and features in one embodiment or in different embodiments described in the specification can be combined.

Further, the terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

The embodiments of the present disclosure are described in detail below, and examples of the embodiments are illustrated in the drawings. The embodiments described below are only used to explain the embodiments of the present disclosure, and should not be construed as limit to the scope of embodiments of the present disclosure.

A First Embodiment

Figure 1:
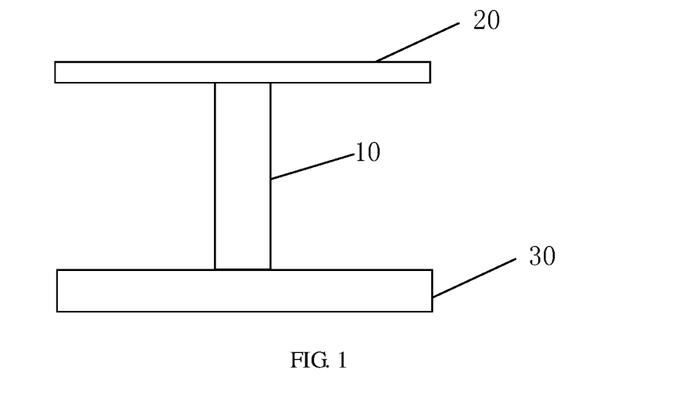
FIG. 1 is a schematic diagram of a first embodiment of a stereoscopic display device according to an embodiment of the present disclosure.

FIG. 1 is a schematic diagram of a first embodiment of a stereoscopic display device according to an embodiment of the present disclosure; as shown in FIG. 1, the stereoscopic display device according to this embodiment comprises: a control device 10, a display screen 20 and a substrate 30; and the control device 10 is configured to adjust a distance between the display screen 20 and the substrate 30.

Specifically, the control device 10 may control the distance between the substrate and the display screen in a corresponding position of an image according to a stereoscopic display feature of the image displayed by the display screen, so that the display screen presents a protrusion-and-recession state, so as to present a real stereoscopic display effect. In general, it is necessary for the substrate to have an electric driving function, and send a driving signal to the control device 10, so that the control device 10 makes an action of adjusting the distance between the display screen 20 and the substrate 30, for example, the control device 10 has one end facing the display screen 20, and the other end facing the substrate 30, and under the action of the driving signal, the control device has its length changed, to implement a change in the distance between the display screen 20 and the substrate 30.

In the technical solution of the embodiment of the present disclosure, the control device is provided between the display screen and the substrate, so that the control device may adjust the distance between the display screen and the substrate, so as to enhance the stereoscopic display effect of the display screen.

A Two Embodiment

In this embodiment, a technical solution of the embodiment of the present disclosure will be further described in more detail, on the basis of the embodiment shown in FIG. 1.

Exemplarily, the control device may include: at least one telescopic member 110, provided between the substrate and the display screen, and including: an extending member 101, including one end close to the substrate and the other end away from the substrate; a fixed portion 102, with one end connected with the substrate, wherein a distance between the other end of an extension member and one end of the fixed portion away from the substrate is changeable.

Exemplarily, the fixed portion 102 is a hollow base that sleeves the extending member, a bottom portion of the hollow base is connected with the substrate, and the extending member is movable with respect to the hollow base, to change a distance between a portion of the display screen corresponding to the extending member and the substrate.

Wherein, the control device may specifically include at least one extending member and a hollow base that sleeves the extending member, and a bottom portion of the hollow base is connected with the substrate 30, the extending member may protrude from a top portion of the hollow base under an action of a driving force, so that a portion of the display screen 20 corresponding to the extending member moves away from the substrate 30 under an action of a pushing force of the extending member, when the extending member protrudes from the top portion of the hollow base, and the display screen 20 moves close to the substrate 30 when it retracts to the hollow base.

In one embodiment of the embodiments of the present disclosure, such an extending member and a hollow base that sleeves the extending member, as well as a driving force that causes the extending member to implement an extending action may be implemented microelectromechanical system with a (MEMS). The microelectromechanical system includes a micromechanical element, an actuator, and an electronic device. The micromechanical element may be fabricated by using processes of deposition, etching, or partially etching away a base and/or a deposited material layer or adding a layer to form an electric device and an electromechanical device, as well as other micromachining processes.

In other embodiment of the embodiments of the present disclosure, extension and retraction of an extending member 10 may further be implemented in other modes such as a spring or a filled elastic material.

In the technical solution of the embodiment of the present disclosure, at least one extending member and the hollow base that sleeves the extending member are provided between the substrate and the display screen, the bottom portion of the hollow base is connected with the substrate, and the extending member may protrude from the top portion of the hollow base under the action of the driving force, an extending end of the extending member is in contact with the display screen, so that the display screen 20 moves away from the substrate 30 under the action of the pushing force of the extending member, when it protrudes from the hollow base, and the display screen 20 moves close to the substrate 30 when it retracts to the hollow base, so as to enhance the stereoscopic display effect of the display screen.

Figure 2:
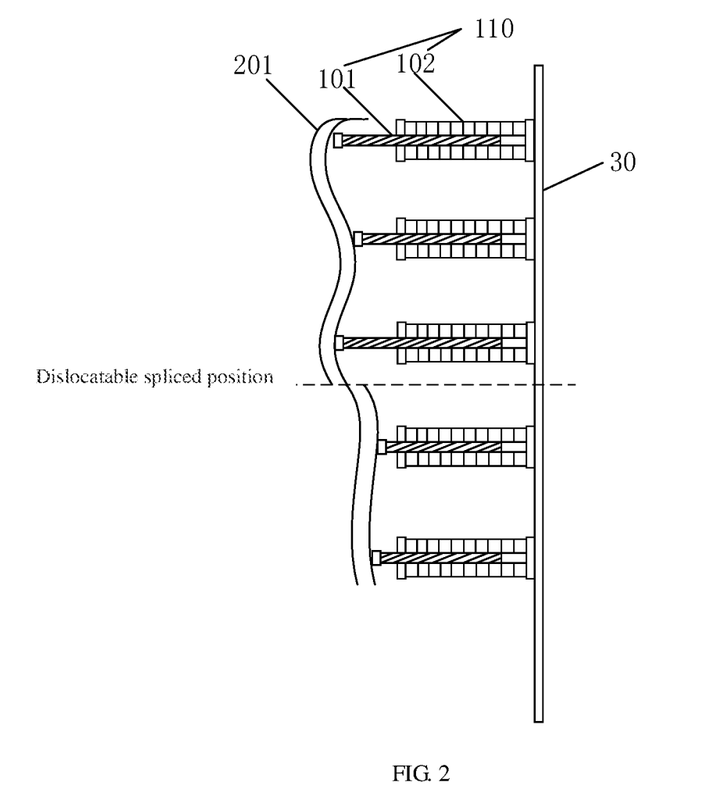
FIG. 2 is a schematic diagram of a second embodiment of a stereoscopic display device according to an embodiment of the present disclosure.

As shown in FIG. 2, the extending member and the hollow base that sleeves the extending member, as well as the driving force that causes the extending member to implement the extending action may be implemented with the microelectromechanical system. Therefore, when this embodiment is specifically implemented, a magnet body 101 is used as the extending member, and an electromagnetic coil 102 is used as the hollow base; when the electromagnetic coil 102 is energized, a magnetic field is formed, and interaction between the magnetic field and the magnet body 101 enables the magnet body 101 to extends from the electromagnetic coil 102, so as to control the distance between the display screen 20 and the substrate 30.

Figure 3:
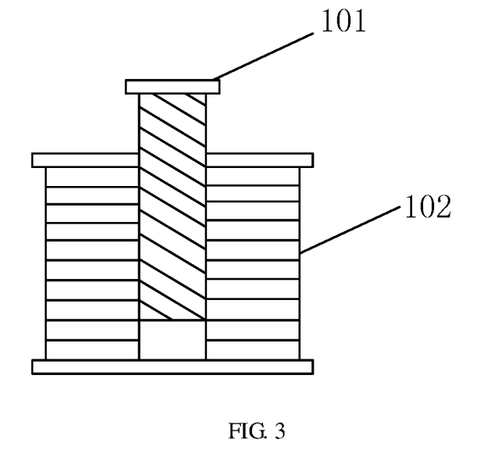
FIG. 3 is a cross-sectional schematic diagram of an electromagnetic coil and a magnet body of the second embodiment of the stereoscopic display device according to the embodiment of the present disclosure.

Exemplarily, as shown in FIG. 3, the hollow base is the electromagnetic coil 102, and the extending member is the magnet body 101; when the electromagnetic coil 102 is energized, a magnetic field is generated; and the magnet body 101 extends from or retracts to the electromagnetic coil 102 under an action of the magnetic field. When the magnet body 101 is screwed into the electromagnetic coil 102, in order to facilitate control of a retraction length of the magnet body 101, a T-shaped magnet body 101 may be used.

Further, the magnet body 101 is a cylindrical structure whose outer surface is provided with a first thread, and an inner surface of the electromagnetic coil 102 is provided with a second thread matching the first thread.

Exemplarily, the magnet body 101 is in thread contact with an inner wall of the electromagnetic coil 102, and the magnet body 101 may be screwed out or screwed in through the thread. Therefore, a degree of fineness of the thread may be adjusted according to actual needs, and an intensity of the magnetic field may be controlled in combination with a current magnitude of the electromagnetic coil 102, so as to control an extension length of the magnet body 101, and to more accurately control the distance between the display screen 20 and the substrate 30.

Figure 4:
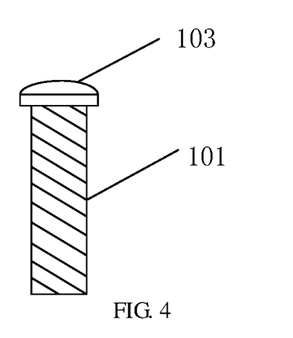
FIG. 4 is a schematic diagram of a magnet body protective layer of the second embodiment of the stereoscopic display device according to the embodiment of the present disclosure.

Further, the display screen 20 is relatively easily scratched, so when this embodiment is specifically implemented, a protective layer 103 may be provided on a surface of the extending end in contact with the display screen 20. As shown in FIG. 4, the protective layer 103 may be made of resin, polyimide (PI), rubber, and other material. At a same time, since the protective layer 103 has a certain thickness, the stereoscopic display effect may be further enhanced.

Further, in order to avoid a problem that the display screen 20 is easily broken under a tension, when the magnet body 101 extends to support the display screen 20 to move away from the substrate 30, the display screen 20 according to this embodiment may be a flexible screen 201.

Further, in order to better achieve the stereoscopic display effect, a spliced display screen 20 may be used, so that a protrusion-and-recession degree of the display screen 20 may be better controlled. Specifically, the display screen 20 includes a plurality of display units, and each display unit corresponds to at least one telescopic member, for example, at least one magnet body 101 and at least one hollow base 20.

Exemplarily, the display unit has a regular shape, for example, a rectangle; the telescopic members are arranged in an array, each display unit may be correspondingly provided with one or more telescopic members, and one telescopic member may correspond to one pixel or more pixels of a display unit.

It should be noted that, the portion of the display screen corresponding to the extending member may be one pixel or a plurality of pixels, and those skilled in the art may set according to actual needs of resolution, which will not be limited in the embodiment of the present disclosure.

Exemplarily, the magnet body 101 and the hollow base 20 are arranged in an array, and according to a size of each display unit, it is made to correspond to the number of magnet bodies 101.

Figure 5:
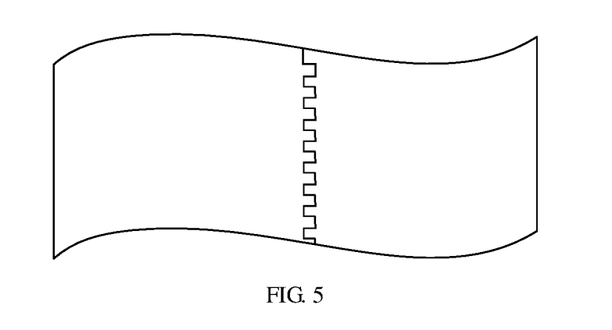
FIG. 5 is a schematic diagram of a connection structure of display units of a display screen of the second embodiment of the stereoscopic display device according to the embodiment of the present disclosure.

As shown in FIG. 5, further, adjacent display units are connected with each other through mutually engaged grooves or through mutually embedded concave-and-convex slide rails, so as to avoid a problem of damage to the display screen 20 due to sliding, when adjacent display units slide and are dislocated relative to each other. The spliced display screen, under the action of the pushing force of the control device according to this embodiment, may further increase the protrusion-and-recession degree of the screen, so that the display screen may achieve a better real stereoscopic display effect. In particular, in a large-sized display screen, a protrusion-and-recession degree of each display unit is adjusted according to a stereoscopic display feature of display content dynamically in real time, which may achieve the stereoscopic display effect more significantly.

Further, in order to enhance the stereoscopic display effect of the display screen, the number of telescopic members of the control device, for example, the number of hollow bases, is lower than the number of pixels of the display screen. Preferably, a ratio of the number of telescopic members of the control device, for example, the number of hollow bases, to the number of pixels of the display screen, may be 1:100 to 1:1000.

Further, the control device receives an electrical signal, for example, a current signal, sent by the substrate, so that the control device adjusts the distance between the substrate and the display screen according to the electrical signal, for example, the current signal, wherein, the current signal matches the stereoscopic display feature displayed by the display screen.

Further, the substrate is a thin film transistor (TFT) substrate. The TFT substrate is currently mainly used in display devices of various types of laptops, desktops and mobile phones, and each liquid crystal pixel point on such type of display devices is driven by a thin film transistor integrated behind the pixel point, so the TFT display screen is also a type of active matrix liquid crystal display device, which also has advantages of high responsivity, high brightness, high contrast, and the like. In this embodiment, the TFT substrate is used for supplying the electrical signal, for example, a current signal, to an inductance coil of the control device, for example, the current signal matches the stereoscopic display feature in the image. For example, when a portion of region in the display screen displays a close object, a current driving signal for an MEMS device in the position drives the MEMS device in the position to be screwed out, so as to correspond thereto, for example, a display unit or a portion of the display unit in contact is protruded, to form a protruding contour of a display object, so as to implement a touchable real stereoscopic display effect.

The substrate used in the embodiment of the present disclosure is not limited to the TFT substrate, and other types of substrates having an electric driving function may also be used.

Exemplarily, the substrate may include a plurality of seamlessly spliced TFT substrates.

Wherein, the display screen 20 is a flexible screen 201.

Wherein, the flexible screen refers to an OLED, which has characteristics such as low power consumption and bendability.

In the display screen 20 according to the technical solution of the embodiment of the present disclosure, the spliced display screen 20 is used, and adjacent display units are connected with each other through mutually engaged grooves or through mutually embedded concave-and-convex slide rails, so as to avoid the problem of damage to the display screen 20 due to sliding, when adjacent display units move and are dislocated relative to each other; in addition, the protective layer 103 is provided on the surface of the magnet body 101 in contact with the display screen 20, to prevent the magnet body 101 from scratching the display screen 20.

A Third Embodiment

Figure 6:
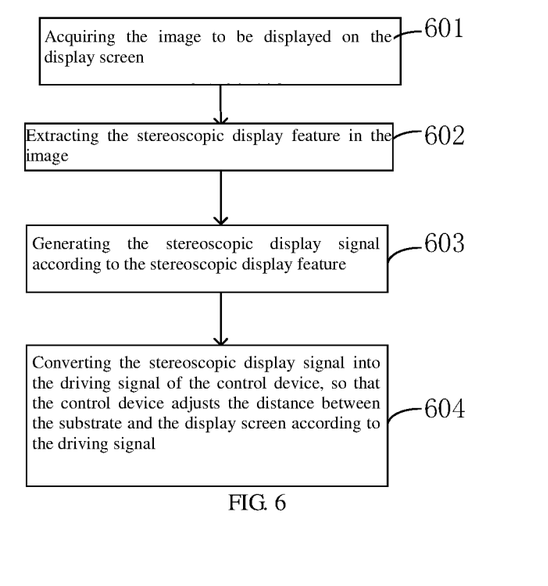
FIG. 6 is a schematic diagram of a first embodiment of a stereoscopic display method according to an embodiment of the present disclosure.

FIG. 6 is a schematic diagram of a first embodiment of a stereoscopic display method according to an embodiment of the present disclosure, and this embodiment is used in the stereoscopic display devices shown in any one of FIG. 1 to FIG. 5. The stereoscopic display method comprises:

Acquiring an image to be displayed on a display screen;

Extracting a stereoscopic display feature in the image;

Obtaining a driving signal of a control device according to the stereoscopic display feature, so that the control device adjusts a distance between a substrate and the display screen according to the driving signal.

Exemplarily, the obtaining a driving signal of a control device according to the stereoscopic display feature, so that the control device adjusts a distance between a substrate and the display screen according to the driving signal, includes: generating a stereoscopic display signal according to the stereoscopic display feature; and converting the stereoscopic display signal into the driving signal of the control device.

Exemplarily, the above-described method is illustrated below in conjunction with the accompanying drawings; and as shown in FIG. 6, the stereoscopic display method according to this embodiment may comprise steps of:

S601: acquiring the image to be displayed on the display screen.

Exemplarily, an executing body according to the embodiment is a control unit connected with the MEMS, for example, the control unit acquires image information.

S602: extracting the stereoscopic display feature in the image.

Exemplarily, after acquiring the image to be displayed on the display screen 20, the control unit analyzes and processes the image, extracts the stereoscopic display feature in the image, and obtains a display unit corresponding to the stereoscopic display feature, or one pixel or a plurality of pixels in a display unit corresponding to the stereoscopic display feature, to determine which display units, or which pixel or pixels in a display unit need to be protruded or recessed.

S603: generating the stereoscopic display signal according to the stereoscopic display feature.

Exemplarily, the stereoscopic display signal that causes the display unit, or one pixel or a plurality of pixels in the display unit to be protruded or recessed is generated according to the stereoscopic display feature.

Exemplarily, the stereoscopic display signal generated according to the stereoscopic display feature may be a distance value of protrusion or recession of a portion of the display unit corresponding to each telescopic element with respect to a reference, for example, a plane at a certain distance from the substrate.

S604: converting the stereoscopic display signal into a driving signal of the control device, so that the control device adjusts the distance between the substrate and the display screen according to the driving signal.

Exemplarily, according to a control instruction sent by the control device to the stereoscopic display device, a portion of the display screen corresponding to the telescopic member, for example, a display unit, or one pixel or a plurality of pixels in a display unit, is protruded or recessed, so as to enhance the stereoscopic display effect of the display screen.

In addition, in addition to adjusting the distance between the substrate and the display screen, the stereoscopic display method according to this embodiment further comprises: simultaneously displaying an image on the display screen, so that synchronization of image displaying and distance adjustment is implemented, and the image displayed on the display screen after distance adjustment may implement a real stereoscopic image, or there may be a slight time difference between image displaying and distance adjustment, but the time difference is hardly perceptible by human eyes, so that the real stereoscopic display effect is implemented.

In the technical solution of the embodiment of the present disclosure, the image of the display screen is acquired and analyzed, the stereoscopic display feature in the image is obtained, and the control instruction is sent to the control device according to the stereoscopic display feature, so that the display screen has a protrusion-and-recession effect, which enhances the stereoscopic display effect of the display screen.

In addition, an embodiment of the present disclosure further provides a fabrication method of any one of the above-described stereoscopic display devices, comprising: fabricating a substrate and a control device by using a semiconductor fabrication process; providing a display screen; and bonding the display screen with the substrate on which the control device is provided.

Exemplarily, the display screen is composed of a plurality of spliced display units, and the providing a display screen includes: providing a plurality of the display units; and splicing the plurality of display units into the display screen.

Other parts that are the same as those according to the first embodiment to the third embodiment will not be repeated.

What are described above is related to the specific embodiments of the disclosure only and not limitative to the scope of the disclosure. The protection scope of the disclosure shall be based on the protection scope of the claims. Any modification and equivalent replacement may be made by those skilled in the art within the substantial protection scope of the embodiments of the present disclosure, which is regarded as falling within the protection scope of embodiments of the present disclosure.

The present application claims priority of Chinese Patent Application No. 201710316666.1 filed on May 8, 2017, and the above Chinese patent application is incorporated herein by reference in its entirety as part of the present application.

The invention claimed is:

1. A stereoscopic display device, comprising: a control device, a display screen and a substrate,
wherein the control device is provided between the display screen and the substrate, and the control device is configured to adjust a distance between the display screen and the substrate,
wherein the control device includes:
at least one telescopic member, provided between the substrate and the display screen, and including:
an extending member, including one end close to the substrate and the other end away from the substrate;
a fixed portion, with an end connected with the substrate,
wherein a distance between the other end of an extension member and an end of the fixed portion away from the substrate is changeable,
wherein the display screen is formed by a plurality of spliced display units, each of the plurality of spliced display units corresponds to a plurality of telescopic members, each of the spliced display units comprises a plurality of pixels, each of the plurality of telescopic members corresponds to one or more of the plurality of pixels,
wherein at least two of the plurality of telescopic members corresponding to one of the plurality of spliced display units are adjusted, to adjust distances between pixels corresponding to the at least two telescopic members and the substrate, so that the spliced display unit is capable of having a protrusion portion and a recession portion at the same time,
wherein a number of the fixed portions of the control device is smaller than a number of pixels of the display screen,
wherein a ratio of the number of the fixed portions of the control device to the number of the pixels of the display screen is 1:100 to 1:1000.

2. The stereoscopic display device according to claim 1, wherein the fixed portion is a hollow base that sleeves the extending member, a bottom portion of the hollow base is connected with the substrate, and the extending member is movable with respect to the hollow base, to change a distance between a portion of the display screen corresponding to the extending member and the substrate.

3. The stereoscopic display device according to claim 2, wherein the extending member extends from a top portion of the hollow base, so that a portion of the display screen corresponding to the extending member moves away from the substrate under an action of a pushing force of the extending member, when the extending member extends from the top portion of the hollow base, and a portion of the display screen corresponding to the extending member moves close to the substrate when the extending member retracts to the hollow base.

4. The stereoscopic display device according to claim 2, wherein the hollow base is an electromagnetic coil, and the extending member is a magnet body; when the electromagnetic coil is energized, a magnetic field is generated; and the magnet body extends from or retracts to the electromagnetic coil under an action of the magnetic field.

5. The stereoscopic display device according to claim 4, wherein the magnet body is a cylindrical structure whose outer surface is provided with a first thread, and an inner surface of the electromagnetic coil is provided with a second thread matching the first thread.

6. The stereoscopic display device according to claim 1, wherein a protective layer is provided on a surface of the extending member opposite to the display screen.

7. The stereoscopic display device according to claim 1, wherein the display units which are adjacent to each other are connected with each other through mutually engaged grooves or through mutually embedded concave-and-convex slide rails.

8. The stereoscopic display device according to claim 1, wherein the control device receives an electrical signal sent by the substrate, so that the control device adjusts the distance between the substrate and the display screen according to the electrical signal, and the electrical signal matches a stereoscopic display feature displayed by the display screen.

9. The stereoscopic display device according to claim 1, wherein the display screen is a flexible screen.

10. The stereoscopic display device according to claim 1, wherein the substrate is a TFT substrate.

11. The stereoscopic display device according to claim 1, wherein the substrate includes a plurality of seamlessly spliced TFT substrates.

12. A stereoscopic display method, which is used in the stereoscopic display device according to claim 1, the method comprising:
acquiring an image to be displayed on a display screen;
extracting a stereoscopic display feature in the image; and
obtaining a driving signal of a control device according to the stereoscopic display feature, so that the control device adjusts a distance between a substrate and the display screen according to the driving signal.

13. The stereoscopic display method according to claim 12, wherein the obtaining a driving signal of a control device according to the stereoscopic display feature, so that the control device adjusts a distance between a substrate and the display screen according to the driving signal, includes:
   generating a stereoscopic display signal according to the stereoscopic display feature; and
   converting the stereoscopic display signal into the driving signal of the control device.

14. The stereoscopic display method according to claim 13, wherein the control device includes:
   at least one telescopic member,
   the converting the stereoscopic display signal into the driving signal of the control device, so that the control device adjusts the distance between the substrate and the display screen according to the driving signal, includes:
   converting the stereoscopic display signal into a driving signal in one-to-one correspondence with the at least one telescopic member.

15. A fabrication method of the stereoscopic display device according to claim 1, comprising:
   fabricating a substrate and a control device by using a semiconductor fabrication process;
   providing a display screen; and
   cell-assembling the display screen with the substrate on which the control device is provided.

16. The fabrication method according to claim 15, wherein the display screen is formed by a plurality of spliced display unit,
   the providing the display screen includes:
   providing a plurality of the display units; and
   splicing the plurality of display units into the display screen.

* * * * *